No. 722,156. PATENTED MAR. 3, 1903.
C. SPRECKELS.
TOPPING MACHINE FOR BEETS OR LIKE CROPS.
APPLICATION FILED MAY 3, 1900.
NO MODEL. 4 SHEETS—SHEET 1.

Witnesses,

Inventor,
By Claus Spreckels
Dewey Strong & Co.
Attys

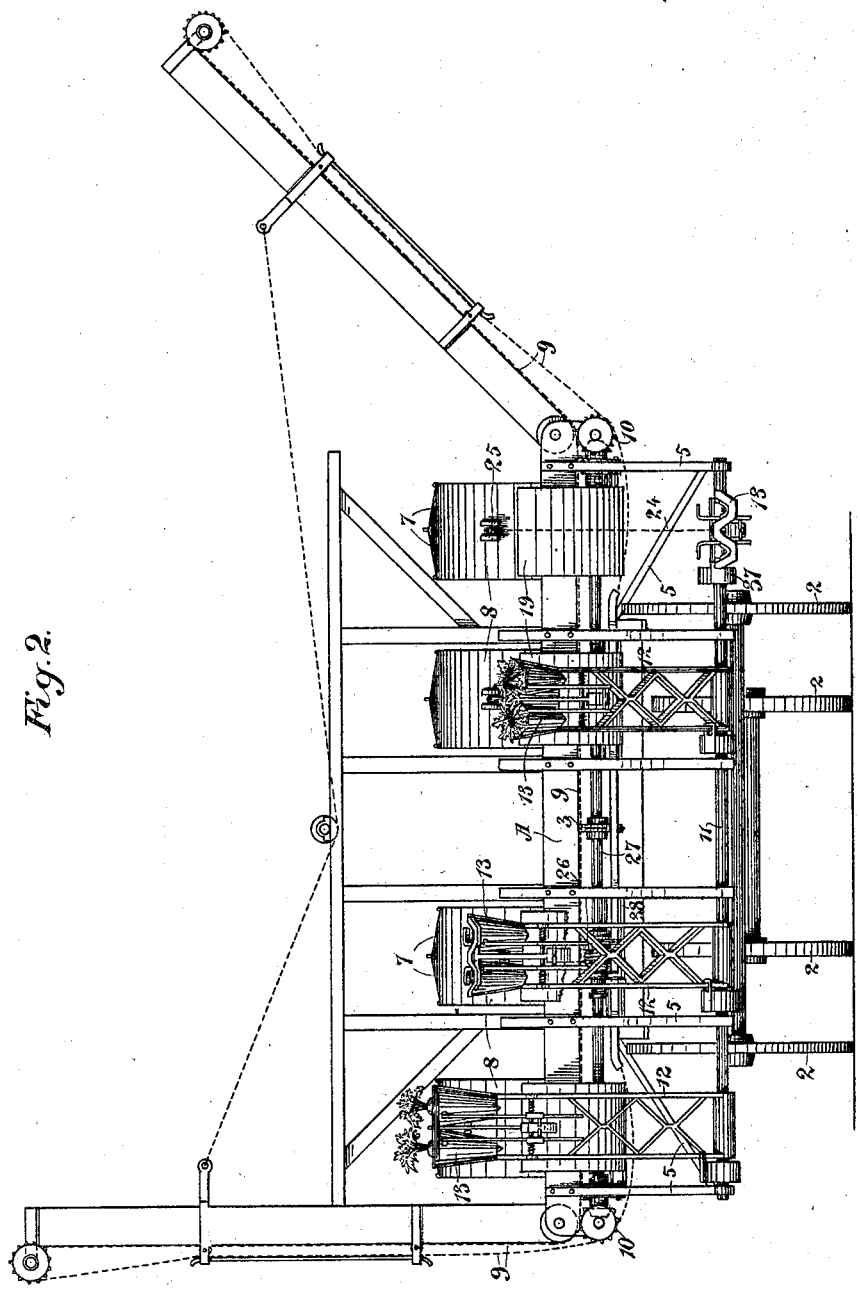

No. 722,156. PATENTED MAR. 3, 1903.
C. SPRECKELS.
TOPPING MACHINE FOR BEETS OR LIKE CROPS.
APPLICATION FILED MAY 3, 1900.
NO MODEL. 4 SHEETS—SHEET 3.
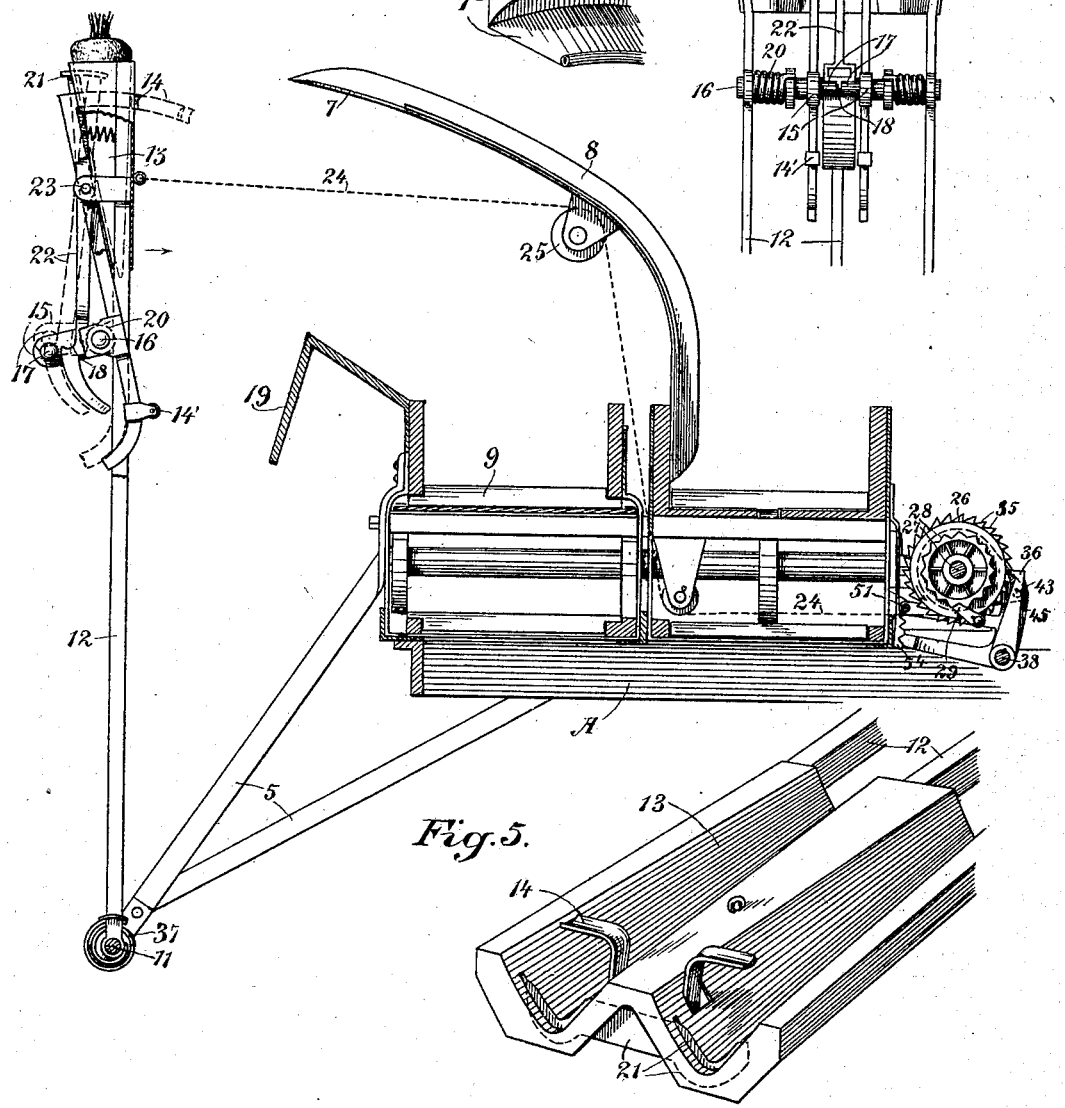

No. 722,156. PATENTED MAR. 3, 1903.
C. SPRECKELS.
TOPPING MACHINE FOR BEETS OR LIKE CROPS.
APPLICATION FILED MAY 3, 1900.
NO MODEL. 4 SHEETS—SHEET 4.

Witnesses,
Inventor
Claus Spreckels
Dewey Strong & Co.
attys

UNITED STATES PATENT OFFICE.

CLAUS SPRECKELS, OF SAN FRANCISCO, CALIFORNIA.

TOPPING-MACHINE FOR BEETS OR LIKE CROPS.

SPECIFICATION forming part of Letters Patent No. 722,156, dated March 3, 1903.

Application filed May 3, 1900. Serial No. 15,298. (No model.)

*To all whom it may concern:*

Be it known that I, CLAUS SPRECKELS, a citizen of the United States, residing in the city and county of San Francisco, State of California, have invented an Improvement in Topping-Machines for Beets or Like Crops; and I hereby declare the following to be a full, clear, and exact description of the same.

My invention relates to an apparatus which is designed for removing the tops from beets and similar root crops or like substances; and it is especially designed for removing the tops from sugar-beets preparatory to the manufacture of the beets into sugar.

It consists of a suitably-propelled apparatus mounted upon wheels and adapted to be moved over the surface of the ground, said apparatus having clamps or holders into which the beets are placed and knives or cutters and a means for elevating the holders so as to bring the beets or the like into such position with relation to the cutters that the tops will be removed and the beets will be delivered upon an endless traveling conveyer and thence to wagons, while the tops are allowed to fall upon the ground or delivered to a second conveyer.

My invention comprises mechanism by which these operations are carried out and details of construction, which will be more fully explained by reference to the accompanying drawings, in which—

Figure 1:
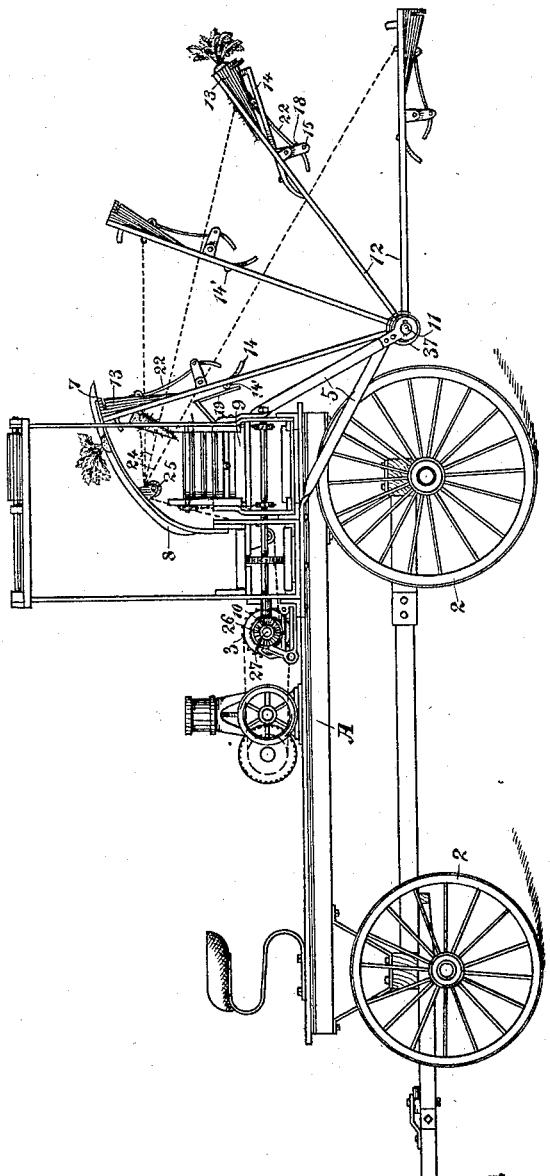
Figure 6:
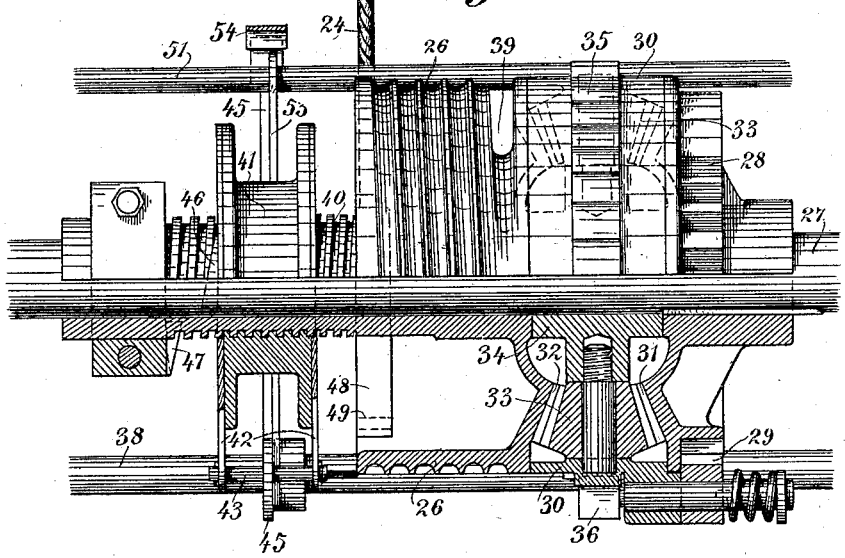
Figure 7:
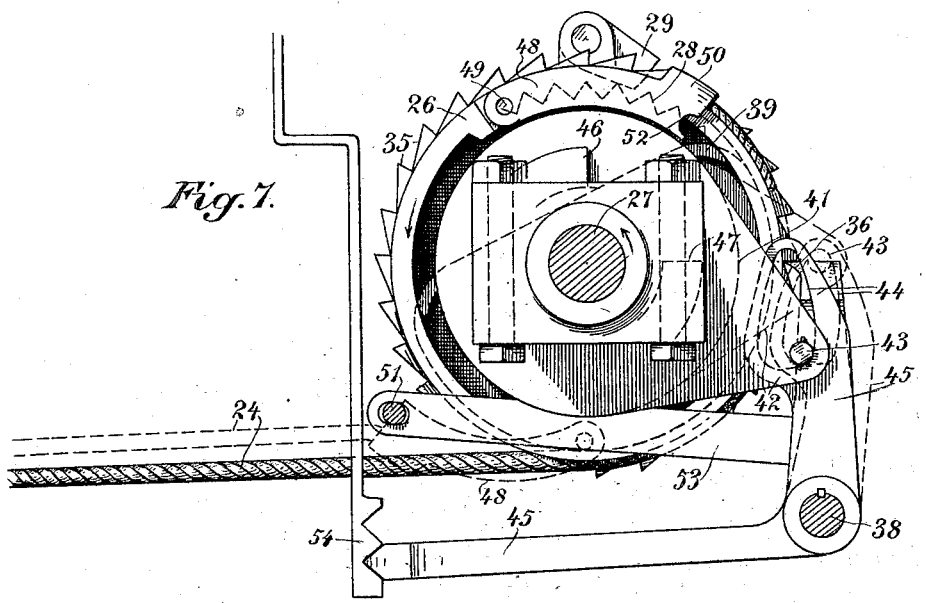

Figure 1 is a side elevation of my machine. Fig. 2 is a rear end view of the same. Fig. 3 is an enlarged detail view of Fig. 1. Fig. 4 is a bottom view of one of the beet-holders. Fig. 5 is a top view of the same. Fig. 6 is a top view of the winding-drum and connections, one-half being shown in section. Fig. 7 is an end view of the same. Fig. 8 is a top view of the knives.

Beets such as are used for the manufacture of sugar are planted in parallel rows, and when they are ripe and ready for use they are loosened in the ground by plowing along the rows, so as to loosen the beets up and leave them in condition to be picked up by hand. My apparatus, which may be of any suitable or desired form and propelled by any power, is designed to pass along these rows, and the beets are placed in the apparatus, which cuts off the tops, delivers the beets into wagons to be conveyed to the mill, and disposes of the tops in any desired manner.

As here shown, the machine consists of a platform or body A, mounted upon wheels 2, and it is propelled either by animal power or by an engine of any description, or it may be propelled by any electrical motor, as convenience admits. As is shown here, the wagon is pulled by horses, and upon the wagon is stationed a small gas or steam engine, from which power is derived to drive the sprocket-wheel 3 upon the shaft 27, to which shaft is fixed the device for raising and lowering arms 12. The knives or cutters are shown at 7, and from these cutters a curved guide 8 serves to deliver the tops outside. The beets fall inside of this guide upon an endless traveling conveyer 9, which in turn transmits them outwardly from the line of travel of the machine, and by driving a wagon beneath the end of the discharge-spout of the elevator the beets will be received into the wagon, by the aid of which they may be afterward transferred to the mill or other desired point.

The conveyer-belt may be reversed to discharge at either side, with an elevator at each end, either of which can be used.

The tops after being cut from the beets may either fall upon the ground or be delivered to a second conveyer, which will discharge them at one side of the line of travel of the machine. Power to drive the conveyer is also derived from shaft 27, as shown at 10.

Extending toward the rear from the wagon-frame are strong braces 5, which form rigid bearings for the shaft 11, upon which are mounted the arms 12, carrying a holder upon their outer ends. These carriers are adapted to receive beets, which are placed in them by hand, and by means of clamps 14 the beets are held in the carriers, and the carriers are then raised from their horizontal position, turning about their fulcrum-points so as to bring the beets up to the cutters 7 in such position that the tops will be severed from the beets. At the same time the clamps are released to allow the beets to be delivered to the conveyer, as previously described.

The beet-holders 13 are here shown as trough-shaped, two of them lying side by side, so that two beets can be placed in the troughs, and the clamps 14 pass through slots in the troughs and are bent at right angles extending along beneath the troughs, having arms 15 fixed to them, which are mounted upon a shaft 16. The arms 15 are fixed to or are integral with the arms 14 and extend farther back, terminating in a curve, upon which are fixed contact-rollers 14'. The inner ends of the arms 15 carry pins 17, which when the clamps are lifted to release the beets engage with a shoulder 18, and this shoulder retains the clamp in position while the carrier 13 returns to receive a new load. When the beets have reached the knife and just after the tops have been severed, the clamps 14 are lifted and disengaged from the beets by being pressed with their rollers 14' against a stop or projection 19, and when thus disengaged the pins 17 will be engaged with the shoulder 18 and retain the clamps in their elevated position while the carrier 13 swings downward to receive a new charge.

When the beets are placed in the carriers 13, they rest upon a bar 21, which is fixed to the end of the lever-arm 22, having indentations made in its top to conform with the shape of the carrier-bottom, and this bar projects through a slot in the carrier 13, so that by pressing down upon the beets when they are placed in the carriers this bar will be depressed, and the arm 22 will be moved about its fulcrum-point 23, so as to disengage the shoulder 18 from the pin 17 and allow the springs 20 to act and pull the clamps down upon the beets which have been placed in the holder. The arms 12, with the carriers 13, are caused to swing about their fulcrum-shaft 11 by means of cords or ropes 24. One end of each of these ropes connects with one of the carriers 13, and passing over a pulley 25, suitably located with relation to the cutter 7, the rope leads thence over a direction-pulley to a winding-drum 26. This winding-drum is loosely mounted upon a shaft 27. This shaft has turnable with it a ratchet-wheel 28, and a pawl 29, carried upon a pin projecting from the ring 30, engages with the ratchet 28. This ratchet-wheel 28 carries also a beveled gear, (shown at 31,) and opposite to this gear is another gear 32, carried by the sleeve of the rope-drum 26, this sleeve turning loosely upon the shaft 28. Intermediate between the gears 31 and 32 are pinions 33, mounted and turnable on radial pins fixed in a hub 34 and ring 30. The ring within which the pinions 33 are journaled has ratchet-teeth 35 upon its periphery, and by means of a pawl 36 this ratchet may be prevented from rotating or may be released, so as to rotate in unison with the other parts. The operation of this portion of the apparatus will then be as follows: The shaft 27 and the ratchet-wheel 28 turning in the direction shown by the arrow, and the pawl 36 being out of engagement with the ratchet 35, motion will be communicated from the shaft through the ratchet 28 and the gears and pinions 31, 32, and 33 to revolve the drum 26 in the opposite direction from 28, so as to unwind the rope 24 and allow the carriers 13 to descend about their fulcrum-shaft 11. The first movement of the carriers is assisted by a coil-spring 37, connected with the shaft 11 and the arms 12, this spring being coiled when the arms are raised and assisting when the carrier has been released to start it on its return movement. When the beets are laid in the carrier 13, the pressure first applied to the bar 21 releases the clamps 14, which then press upon the beets, as previously described, and a further pressure upon the bar 21 pulls momentarily upon the rope and, acting through a mechanism to be hereinafter described, throws the pawl 36 into engagement with the ratchet 35. This locks all parts to move in the same direction with the shaft 27. This winds the rope 24 upon the drum 26 until the beet has been brought up to the cutters 7. At this instant the rope falls into a slot or channel 39, which is made in the drum, and the rotation of the drum for an instant after this does not wind the rope any farther, but gives the arms 14 the opportunity to strike against the stop and to disengage them from the beet after the top has been cut off, so that the carriers will be free to return for another load. The sleeve to which the drum 26 is fixed has the end opposite to the ratchet-wheel 28 screw-threaded, as shown at 40, and upon these screw-threads a nut 41 is adapted to travel. Upon this nut are projecting disks or arms 42, connected by a pin 43, and this pin projects through a slot 44 in an arm 45, which is keyed upon the shaft 38, this shaft also carrying the pawl 36. The arm 45 projecting between the pair of disks 42 (see Fig. 6) and traveling upon the key or feather on the shaft 38, (see Fig. 7,) it will be manifest that when the drum is being turned to wind up the rope, moving in the same direction as the ratchet-wheel 28, the nut will be caused to travel outwardly and away from the drum. The pin 43 during this time remains in the lower part of the curved slot 44 of the arm 45; but when the rope has been wound up, the nut reaching the outer end of its travel, a lug 46, carried by the nut, comes in contact with a lug 47, which is fixed to the outer end of the sleeve and turnable with it, and this engagement turns the disks 42, thus moving the pin in the slot 44 upwardly, and by its action it forces the arm 45 outwardly, and thus disengages the pawl 36 from the ratchet-wheel 35. As soon as this disengagement takes place the parts will be unlocked, the drum will rotate in the opposite direction from the shaft 27, and the nut will be returned to a point adjacent to the drum. As soon as the parts are released the spring 37 assists to return the carriers over the center and also takes up any slack in the rope, after which the carriers complete their return movement by gravitation. When the rope is unwinding, the drum rotates in the opposite direction from the drive-shaft 27. The rope 24 is connected with the drum 26 by an arm 48, which is pivoted to the drum, as shown at 49, and it has a socket or clamp, as at 50, into which the end of the rope is fixed. Parallel with the shaft 27 and at a short distance away from the periphery of the drum is an elastic rod or bar 51, so supported that it may be caused to spring by pressure brought upon it at the proper time and for reasons to be hereinafter described. When the rope coils upon the drum, the connecting-bar 48 lies close against the periphery of the drum and inside of the elastic bar 51, so as not to contact with it; but when the rope unwinds from the drum as the end of the rope passes off the drum this arm 48 will turn about its pivot-point 49, so as to stand in the line of movement of the rope as it leaves the drum. The end of the head 50, in which the rope is secured, has a curved slot or recess 52, and when the arm is straightened out, as just described, in the line of movement of the rope this recess will be in line with the elastic bar or shaft 51 and will strike against it. This serves as a stop and prevents any further movement of the drum and takes place when the carriers have arrived at the approximately horizontal position where they are to receive their load. The stopping of the drum 26 also stops the return travel of the nut 41 on the screw on which it travels, and it also stops the movement of the bevel-gear 32, which is integral with it. The pinions 33, being in engagement with the bevel-gears 31, will then be caused to travel around with 31, which continues to be driven by its connection with the shaft 27, and will consequently roll upon the gear 32, which now remains stationary. In order to again revolve the drum to wind up the rope when the beets are laid upon the carriers 13 and by pressure upon them, the bar 21 is depressed, and through it the clamps 14 are disengaged, so as to clamp the beets in the holders, a little additional pressure producing a momentary pull upon the rope, and as the rope is now stopped by the contact of the arm 48 with the spring-bar 51 this pull is transmitted to the bar 51, and by reason of its elasticity it is pushed a little down. This bar 51 is connected with the lever-arm 45 by a link 53, and the pressure through this link 53 applied to the lever 45 acts to turn the shaft 38 slightly and to throw the pawl 36, which is keyed to the shaft, into engagement with the ratchet-wheel 35 of ring 30. This stops the rotation of the ratchet-wheel on the band 30, and the pawl 29 will be engaged by the ratchet-wheel 28, and the parts will be caused to revolve in the same direction with the shaft 27 and the ratchet-wheel 28. This engagement locks the gear 31 to the band and its pinions 33. These pinions 33 not being in motion while locked to the gear 31, the bevel-wheel 32 will be simply carried in the same direction with the shaft 27, and with it the drum, which consequently winds up the rope again until the nut 41 has struck the lug 47 and again disengaged the pawl 36 from the ratchet-wheel 35. This disengagement allows the bevel-wheel 31 to again turn the pinions 33, and they in turn revolve the bevel-wheel 32 in the opposite direction from the shaft 27, and thus again unwind the rope. When the elastic bar or shaft 51 is moved and through the link 53 moves the shaft 38 and disengages the pawl 36 from the ratchet-wheel 35, the parts are held in this position by means of a notched spring-arm 54, which engages the beveled end of the arm 45. Another notch in the spring engages the end of the arm when it is tilted to throw the pawl 36 into engagement with the ratchet; but the angles of the notches are such that a little pressure upon the lever-arm will cause the spring 54 to yield and allow the lever to be disengaged.

When the machine travels in one direction across the field, the conveyer is driven to carry the beets to an elevator connected with it at the delivery end. When the machine returns, the conveyer travels in the opposite direction and delivers the beets to a similar elevator at the opposite end. These elevators are hinged or connected, so that the one not in use may be turned up out of the way and the other let down to the proper angle.

Having thus described my invention, what I claim as new, and desire to secure by Letters Patent, is—

1. An apparatus for removing the tops from root and like crops, including a knife or cutter, carriers and means for clamping the roots thereto with their tops projecting, and means for operating the carriers to cause them to sweep past the edge of the knife or cutter whereby the projecting tops of the roots are severed.

2. An apparatus for removing the tops from beets and the like, including a fixed knife or cutter, carriers and means for operating the same to cause said carriers to sweep past the edge of the knife or cutter, and clamping devices on the carriers adapted to clamp the root of the beet with the top projecting so that the latter is severed as the carrier passes the edge of the knife or cutter.

3. An apparatus for removing the tops from beets and the like, including carriers, clamps by which the beets are secured with their tops projecting; means for operating the carriers, knives having cutting edges arranged substantially at right angles with the path of movement of the carriers and past which the carriers sweep whereby the projecting tops of the beets are severed, means for operating the clamping means to release the beets, and means for returning the carriers.

4. An apparatus for removing the tops from beets and the like consisting of carriers, mounted upon pivoted arms, clamps, and springs whereby said clamps are normally elevated above the carriers, and a pressure-bar connected with the clamps and upon which the beets are laid and by which the clamp-retainer is disengaged to allow the clamps to press upon the beets and hold them in place.

5. An apparatus for removing the tops from beets and the like consisting of carriers mounted upon pivoted swinging arms with means for moving the carriers from the point where the beets are placed therein, to knives by which the tops are removed, spring-pressed clamps with mechanism for holding them in an elevated position until the beets are placed in the carriers, and a disengaging device actuated by pressure of the beets when placed, whereby the clamps are released and allowed to press upon the beets.

6. In an apparatus for removing the tops from beets and the like, the trough-shaped carriers, pivotally-mounted spring-pressed clamps, a pivoted arm by which each clamp is carried, a bar projecting into the carriers, pins upon the clamp-carrying arms and a retainer to hold the clamps in an elevated position, said retainer being disengaged by pressure of the beets upon the bar to allow the clamps to fall and hold the beets in place.

7. In an apparatus for removing the tops from beets and the like, carriers mounted upon pivoted swinging arms, spring-pressed clamps mounted on the carriers, a device by which the clamps are held in an elevated position while the beets are being placed in the carrier, a pressure-bar and connections between the same and the clamps, whereby the retainer is disengaged to allow the clamps to fall, means for elevating the carriers, a knife with which the tops are brought into contact by said movement and severed from the beets, and a pressure plate or stop with which the ends of the clamping-arms come in contact whereby they are raised to disengage them from the beets and to again engage them with the retainer whereby they remain in an elevated position while the carrier returns to receive another charge.

8. An apparatus for removing the tops from beets consisting of a structure mounted upon wheels and adapted to be propelled between the rows of beets, a series of carriers, means for holding the beets in the carriers with the tops projecting, pivoted arms upon which said carriers are mounted, a knife or cutter fixed in the parts of the projecting tops of the beets, means for swinging said arms in arcs of circles whereby the carriers are brought into an approximately horizontal position to allow beets to be placed therein, and afterward moved upwardly to bring the tops into direct contact with the fixed cutter whereby they are removed from the beets.

9. An apparatus for removing the tops from beets and the like, consisting of a structure mounted upon wheels and adapted to be propelled parallel with the rows of beets, carriers mounted upon arms, whereby the carriers are brought into an approximately horizontal position to allow the beets to be placed therein, mechanism by which the beets are clamped to the carriers with their tops projecting, mechanism by which the carriers are moved to bring the tops directly into contact with cutters whereby they are removed from the beets, mechanism for disengaging the clamps to allow the beets to fall from the carriers, and transversely-movable carrying-belts upon which the beets are received and by which they are delivered to one side of the apparatus.

10. An apparatus for removing the tops from beets consisting of a structure mounted upon wheels and adapted to travel parallel with the rows of beets, carriers mounted upon pivoted arms and having spring-pressed clamps whereby the beets are held in carriers, ropes connected with the carriers, and winding-drums upon which the ropes are coiled to raise the carriers, and knives located with relation to the path of the carriers so as to remove the tops from the beets, means for disengaging the clamps to allow the beets to fall from the carriers, and means to return the carriers to an approximately horizontal position to receive another load.

11. An apparatus for removing the tops from beets and the like consisting of a structure mounted upon wheels and adapted to travel parallel with the rows of beets, carriers mounted upon pivoted arms, having spring-pressed clamps by which the beets are held when placed in the carriers, ropes connected to the carriers, winding-drums upon which the ropes are wound to raise the carriers and beets, cutters at the end of their arc of travel with which the tops come in contact and by which they are severed from the beets, mechanism by which the clamps are moved to release the beets to allow them to fall upon conveyers, mechanism by which the arms and carriers are returned to a position to receive another load, and springs connected with the carrier-arms whereby the return movement is commenced and the slack of the ropes is taken up.

12. In an apparatus for removing the tops from beets, carriers mounted upon pivoted swinging arms with clamps by which the beets are held therein, a drum, a rope connecting the carriers with said drum, and mechanism by which the drum is rotated to coil the rope and raise the carriers, knives located in the path of the carriers by which the tops are removed from the beets, channels made in the drum into which the rope falls whereby the advance of the carrier is checked and a disengaging plate or stop whereby the clamps are withdrawn to allow the beets to fall previous to the return movement of the carriers.

13. In a beet-trimming machine, the combination with a cutter for severing the beet-tops, of a carrier adapted to carry the beets past said cutter with their tops in line with said cutter, and a separate carrier for carrying the beet-tops after being severed, substantially as specified.

14. A traveling field apparatus for removing the tops from roots and like crops, including a cutter; a carrier adapted to hold the root with its leaves and upper portion of its body projecting; and means whereby the carrier is caused to convey the projecting portion of the body of the root into the range of action of the cutter.

In witness whereof I have hereunto set my hand.

CLAUS SPRECKELS.

Witnesses:
A. F. ESTABROOK,
JAMES L. KING.